(12) United States Patent
Motoyoshi

(10) Patent No.: US 9,018,338 B2
(45) Date of Patent: Apr. 28, 2015

(54) POLYCARBONATE RESIN AND MOLDED ARTICLE THEREOF

(75) Inventor: Tetsuya Motoyoshi, Tokyo (JP)

(73) Assignee: Teijin Limited, Osaka (JP)

( * ) Notice: Subject to any disclaimer, the term of this patent is extended or adjusted under 35 U.S.C. 154(b) by 163 days.

(21) Appl. No.: 13/824,493

(22) PCT Filed: Sep. 29, 2011

(86) PCT No.: PCT/JP2011/073024
§ 371 (c)(1),
(2), (4) Date: Jun. 10, 2013

(87) PCT Pub. No.: WO2012/046789
PCT Pub. Date: Apr. 12, 2012

(65) Prior Publication Data
US 2013/0253162 A1    Sep. 26, 2013

(30) Foreign Application Priority Data
Oct. 5, 2010    (JP) ................ 2010-225611

(51) Int. Cl.
*C08G 64/00* (2006.01)
*C08G 64/06* (2006.01)
*C08G 64/16* (2006.01)
*C08J 5/18* (2006.01)
*C08G 63/02* (2006.01)

(52) U.S. Cl.
CPC ............ *C08G 64/06* (2013.01); *C08G 64/1608* (2013.01); *C08J 5/18* (2013.01); *C08J 2369/00* (2013.01)

(58) Field of Classification Search
USPC ........................................ 528/196, 198, 201
See application file for complete search history.

(56) References Cited

U.S. PATENT DOCUMENTS

2011/0288261 A1    11/2011    Motoyoshi et al.

FOREIGN PATENT DOCUMENTS

| JP | 2009-62501 | 3/2009 |
| JP | 2009-79190 | 4/2009 |
| JP | 2010-134232 | 6/2010 |

OTHER PUBLICATIONS

International Search Report issued Nov. 29, 2011 in International (PCT) Application No. PCT/JP2011/073024.
Saber Chatti, et al. "Copolycarbonates of Isosorbide and Various Diols", Journal of Polymer Science, Part A: Polymer Chemistry, Apr. 24, 2006, 44(11), p. 3616-3628.
International Preliminary Report on Patentability and Written Opinion issued May 16, 2013 in corresponding International Application No. PCT/2011/073024.

*Primary Examiner* — Terressa Boykin
(74) *Attorney, Agent, or Firm* — Wenderoth, Lind & Ponack, L.L.P.

(57) ABSTRACT

A resin that has high heat resistance, high surface hardness and excellent moldability, and is obtained from a biomass resource, and a molded article thereof. The resin comprises a unit (A) and a unit (B) as the main recurring units, and the molar ratio of the unit (A) to the unit (B) being 5/95 to 95/5.

12 Claims, No Drawings

POLYCARBONATE RESIN AND MOLDED ARTICLE THEREOF

TECHNICAL FIELD

The present invention relates to a polycarbonate resin which has high heat resistance, high surface hardness and excellent moldability and to a molded article thereof.

BACKGROUND ART

Polycarbonate resins (may be referred to as "PC" hereinafter) are polymers in which an aromatic diol or an aliphatic diol is coupled by a carbonic acid ester. Out of these, a polycarbonate resin obtained from 2,2-bis(4-hydroxyphenyl)propane (commonly known as bisphenol A) has high transparency, high heat resistance and excellent mechanical properties such as impact resistance and therefore is used in a wide variety of fields such as electric and electronic parts, optical parts, auto parts and mechanical parts in the form of a molded article or a film.

Although bisphenol-A-PC has such excellent characteristic properties, its surface is very soft and easily scratched. To cope with this, Patent Document 1 discloses that the pencil hardness can be increased to about H by using isosorbide produced from a biomass resource as a raw material as compared with bisphenol A-PC which has a pencil hardness of about 4B.

Patent Document 2 and Patent Document 3 disclose co-PC of an aromatic diol and this isosorbide which is used as a comonomer.

However, a polycarbonate copolymer of 9,9-bis(4-hydroxy-3-methylphenyl)fluorene and isosorbide disclosed by Patent Document 2 has a high glass transition temperature and poor flowability. A copolymer of 1,1-bis(4-hydroxyphenyl)decane and isosorbide disclosed by Patent Document 3 has a pencil hardness which is intermediate between that of isosorbide as disclosed by Patent Document 1 and that of bisphenol-A-PC.

Therefore, a material which has high heat resistance, high surface hardness and excellent moldability and is obtained from a biomass resource meeting these requirements and a molded article thereof are as-yet-unknown.

(Patent Document 1) JP-A 2009-79190
(Patent Document 2) JP-A 2010-134232
(Patent Document 3) JP-A 2009-62501

DISCLOSURE OF THE INVENTION

It is an object of the present invention to provide a resin which has high heat resistance, high surface hardness and excellent moldability and is obtained from a biomass resource and a molded article thereof.

The inventors of the present invention conducted intensive studies and found that a polycarbonate resin which has high heat resistance, high surface hardness and excellent moldability and a molded article thereof can be obtained by containing a unit (A) derived from a biomass-derived ether diol and a unit (B) in a specific ratio. The present invention was accomplished based on this finding.

That is, the present invention is as follows.

1. A polycarbonate resin comprising a unit (A) represented by the following formula:

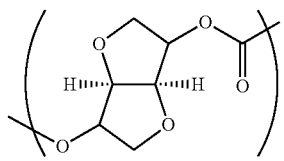

and a unit (B) represented by the following formula:

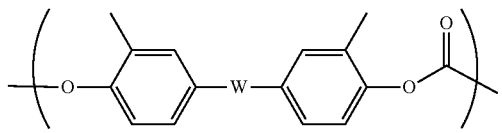

[In the formula (B), W is a single bond or selected from the following formulas (W):

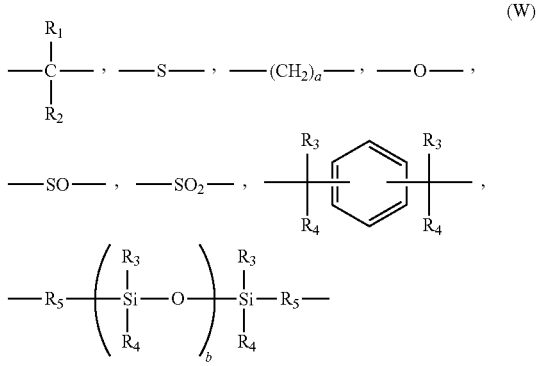

($R_1$ and $R_2$ are each independently a hydrogen atom, fluorine atom, chlorine atom, bromine atom, iodine atom, alkyl group having 1 to 9 carbon atoms, alkoxy group having 1 to 5 carbon atoms, aryl group having 6 to 12 carbon atoms, alkenyl group having 2 to 5 carbon atoms or aralkyl group having 7 to 17 carbon atoms. $R_1$ and $R_2$ may be bonded together to form a carbon ring or heterocyclic ring. $R_3$ and $R_4$ are each independently a hydrogen atom, fluorine atom, chlorine atom, bromine atom, iodine atom, alkyl group having 1 to 9 carbon atoms, alkoxy group having 1 to 5 carbon atoms or aryl group having 6 to 12 carbon atoms. $R_5$ is an alkylene group having 1 to 9 carbon atoms. a is an integer of 0 to 20, and b is an integer of 1 to 500.)]

as the main recurring units, the molar ratio of the unit (A) to the unit (B) being 5/95 to 95/5.

2. The polycarbonate resin in the above paragraph 1, wherein the molar ratio of the unit (A) to the unit (B) is 30/70 to 90/10.

3. The polycarbonate resin in the above paragraph 1, wherein the unit (A) is a unit (A1) represented by the following formula:

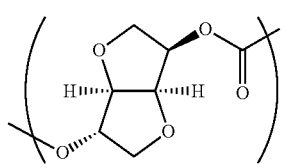

4. The polycarbonate resin in the above paragraph 1 which has a glass transition temperature of 110 to 155° C.

5. The polycarbonate resin in the above paragraph 1 which has a pencil hardness of 2H or more.
6. A molded article formed from the polycarbonate resin in any one of the above paragraphs 1 to 5.
7. A film formed from the polycarbonate resin in any one of the above paragraphs 1 to 5.

BEST MODE FOR CARRYING OUT THE INVENTION

The present invention will be described in detail hereinunder.

<Polycarbonate Resin>

The polycarbonate resin of the present invention comprises a unit (A) and a unit (B) as the main recurring units.

(Unit (A))

The unit (A) is derived from an aliphatic diol having an ether group. The diol having an ether bond is a material having high heat resistance and high pencil hardness among biomass resources.

Examples of the unit (A) include units (A1), (A2) and (A3) represented by the following formulas which are stereoisomeric with one another.

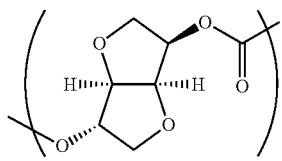

(A1)

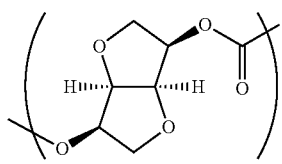

(A2)

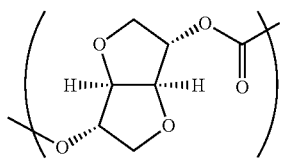

(A3)

They are carbohydrate-derived ether diols, obtained from the biomass of the natural world and called "recyclable resources". The units (A1), (A2) and (A3) are units derived from isosorbide, isomannide and isoidide, respectively. Isosorbide is obtained by hydrogenating D-glucose obtained from starch and dehydrating the obtained product. The other ether diols are obtained from similar reactions to the above reaction except for the starting material.

The unit derived from isosorbide (1,4:3,6-dianhydro-D-sorbitol) out of isosorbide, isomannide and isoidide is preferred as it is easily produced and has high heat resistance.

(Unit (B))

The unit (B) is a carbonate unit having an o-methyl-substituted aromatic structure. In the unit (B), W is a single bond or selected from the following formulas (W).

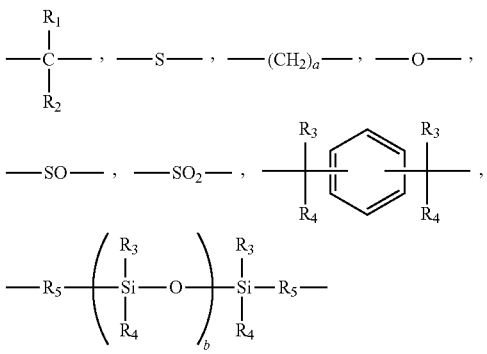

(W)

In the above formulas, $R_1$ and $R_2$ are each independently a hydrogen atom, fluorine atom, chlorine atom, bromine atom, iodine atom, alkyl group having 1 to 9 carbon atoms, alkoxy group having 1 to 5 carbon atoms, aryl group having 6 to 12 carbon atoms, alkenyl group having 2 to 5 carbon atoms or aralkyl group having 7 to 17 carbon atoms. $R_1$ and $R_2$ may be bonded together to form a carbon ring or heterocyclic ring.

Examples of the alkyl group having 1 to 9 carbon atoms include methyl group, ethyl group, propyl group, butyl group, heptyl group, hexyl group and octyl group. Examples of the alkoxy group having 1 to 5 carbon atoms include methoxy group, ethoxy group, propoxy group, butoxy group and heptoxy group. Examples of the aryl group having 6 to 12 carbon atoms include phenyl group, methylphenyl group, naphthyl group and fluorene group. Examples of the alkenyl group having 2 to 5 carbon atoms include ethenyl group, propenyl group, butenyl group, heptenyl group, hexynyl group and octynyl group. Examples of the aralkyl group having 7 to 17 carbon atoms include benzyl group.

$R_3$ and $R_4$ are each independently a hydrogen atom, fluorine atom, chlorine atom, bromine atom, iodine atom, alkyl group having 1 to 9 carbon atoms, alkoxy group having 1 to 5 carbon atoms or aryl group having 6 to 12 carbon atoms. Examples of the alkyl group having 1 to 9 carbon atoms include methyl group, ethyl group, propyl group, butyl group, heptyl group, hexyl group and octyl group. Examples of the alkoxy group having 1 to 5 carbon atoms include methoxy group, ethoxy group, propoxy group, butoxy group and heptoxy group. Examples of the aryl group having 6 to 12 carbon atoms include phenyl group, methylphenyl group, naphthyl group and fluorene group.

$R_5$ is an alkylene group having 1 to 9 carbon atoms. Examples of the alkylene group having 1 to 9 carbon atoms include methylene group, ethylene group, trimethylene group, tetramethylene group, pentamethylene group, hexamethylene group and octamethylene group.

a is an integer of 0 to 20, and b is an integer of 1 to 500.

Examples of the unit (B) include units derived from 3,3'-dimethyl(1,1'-biphenyl)-4,4'diol, 1,1-bis(4-hydroxy-3-methylphenyl)ethane, 2,2-bis(4-hydroxy-3-methylphenyl)propane (to be referred to as bisphenol C hereinafter), 2,2-bis(4-hydroxy-3-methylphenyl)butane, 1,1-bis(4-hydroxy-3-methylphenyl)-1-phenylethane, 1,1-bis(4-hydroxy-3-methylphenyl)cyclohexane, 1,1-bis(4-hydroxy-3-methylphenyl)-3,3,5-trimethyl cyclohexane, 2,2-bis(4-hydroxy-3-methylphenyl)pentane and 1,1-bis(4-hydroxy-3-methylphenyl)-4-isopropylcyclohexane. Units derived from bisphenol C, 1,1-bis(4-hydroxy-3-methylphenyl)cyclohexane and 3,3'-dimethyl(1,1'-biphenyl)-4,4'diol are preferred from the viewpoints of pencil hardness, heat resistance and moldability. They may be used in combination of two or more.

(Composition)

When the polycarbonate resin of the present invention comprises the unit (A) and the unit (B) as the main recurring units and has an isosorbide component as the unit (A), its pencil hardness is high while it has a biomass resource. Further, when the polycarbonate resin has an o-methyl-substituted aromatic component as the unit (B), its pencil hardness can be made higher. Therefore, the molar ratio of the unit (A) to the unit (B) is 5/95 to 95/5, preferably 30/70 to 90/10. When the molar ratio (A/B) is 30/70 to 90/10, the polycarbonate resin has high pencil hardness, high heat resistance and excellent moldability. The molar ratio of the unit (A) to the unit (B) is more preferably 40/60 to 90/10. The molar ratio (A/B) is much more preferably 40/60 to 80/20, particularly preferably 45/55 to 75/25 as the pencil hardness can be easily set to 2H or more. When the molar ratio (A/B) is lower than 30/70, the content of a biogenic matter becomes low and when the molar ratio (A/B) is higher than 90/10, the pencil hardness lowers with the result that the surface becomes soft.

The expression "main recurring units" in the present invention means that they are contained in an amount of not less than 70 mol %, preferably not less than 80 mol %, more preferably not less than 90 mol %, much more preferably 100 mol % based on the total of all the units. The molar ratio of units is calculated by measuring with the JNM-AL400 proton NMR of JEOL LTD.

The polycarbonate resin of the present invention may comprise a unit other than the unit (A) and the unit (B) in an amount of not more than 30 mol %, preferably not more than 20 mol %, more preferably not more than 10 mol %. The above unit is a unit derived from a linear aliphatic diol compound, a unit derived from an alicyclic diol, a unit derived from an aromatic dihydroxy compound or a mixture thereof.

Examples of the linear aliphatic diol include ethylene glycol, 1,3-propanediol, 1,4-butanediol, 1,5-pentanediol, neopentyl glycol, 1,6-hexanediol, 1,7-heptanediol, 1,8-octanediol, 2-ethyl-1,6-hexanediol, 2,2,4-trimethyl-1,6-hexanediol, 1,10-decanediol, hydrogenated dilinoleyl glycol and hydrogenated dioleyl glycol. Out of these, 1,3-propanediol, 1,4-butanediol, 1,6-hexanediol and 1,10-decanediol are preferred. These linear aliphatic diols may be used alone or in combination of two or more.

Examples of the alicyclic diol include cyclohexanediols such as 1,2-cyclohexanediol, 1,3-cyclohexanediol, 1,4-cyclohexanediol and 2-methyl-1,4-cyclohexanediol; cyclohexanedimethanols such as 1,2-cyclohexanedimethanol, 1,3-cyclohexanedimethanol and 1,4-cyclohexanedimethanol; norbornanedimethanols such as 2,3-norbornanedimethanol and 2,5-norbornanedimethanol; and tricyclodecanedimethanol, pentacyclopentadecanedimethanol, 1,3-adamantanediol, 2,2-adamantanediol, decalindimethanol and 3,9-bis(2-hydroxy-1,1-dimethylethyl)-2,4,8,10-tetraoxaspiro[5.5]undecane. Out of these, 1,4-cyclohexanedimethanol, tricyclodecanedimethanol and 3,9-bis(2-hydroxy-1,1-dimethylethyl)-2,4,8,10-tetraoxaspiro[5.5]undecane are preferred. These alicyclic diols may be used alone or in combination of two or more.

Examples of the aromatic dihydroxy compound include 4,4'-biphenol, 3,3',5,5'-tetrafluoro-4,4'-biphenol, α,α'-bis(4-hydroxyphenyl)-o-diisopropylbenzene, α,α'-bis(4-hydroxyphenyl)-m-diisopropylbenzene (commonly known as "bisphenol M"), α,α'-bis(4-hydroxyphenyl)-p-diisopropylbenzene, α,α'-bis(4-hydroxyphenyl)-m-bis(1,1,1,3,3,3-hexafluoroisopropyl)benzene, 9,9-bis(4-hydroxyphenyl) fluorene, 9,9-bis(4-hydroxy-3-methylphenyl)fluorene, 9,9-bis(3-fluoro-4-hydroxyphenyl)fluorene, 9,9-bis(4-hydroxy-3-trifluoromethylphenyl)fluorene, 1,1-bis(4-hydroxyphenyl) cyclohexane, 1,1-bis(4-hydroxyphenyl)-3,3,5-trimethylcyclohexane, 1,1-bis(4-hydroxyphenyl)-4-isopropylcyclohexane, 1,1-bis(3-cyclohexyl-4-hydroxyphenyl)cyclohexane, 1,1-bis(4-hydroxyphenyl) cyclopentane, 1,1-bis(3-fluoro-4-hydroxyphenyl) cyclohexane, 1,1-bis(4-hydroxyphenyl) perfluorocyclohexane, 4,4'-dihydroxydiphenyl ether, 4,4'-dihydroxydiphenyl sulfone, 4,4'-dihydroxydiphenyl sulfoxide, 4,4'-dihydroxydiphenyl sulfide, 4,4'-dihydroxy-3,3'-dimethyldiphenyl sulfone, 4,4'-dihydroxydiphenyl sulfone, 4,4'-dihydroxy-3,3'-diphenyl sulfide, 4,4'-dihydroxy-3,3'-diphenyl sulfoxide, 4,4'-dihydroxy-3,3'-diphenylsulfone, 1,1-bis(4-hydroxyphenyl)methane, 1,1-bis(4-hydroxyphenyl)ethane, 2,2-bis(4-hydroxyphenyl)propane (commonly known as "bisphenol A"), 1,1-bis(4-hydroxyphenyl)-1-phenylethane, 2,2-bis(4-hydroxyphenyl)butane, 2,2-bis(4-hydroxyphenyl)pentane, 2,2-bis(4-hydroxy-3-phenylphenyl) propane, 2,2-bis(3-isopropyl-4-hydroxyphenyl)propane, 2,2-bis(3-t-butyl-4-hydroxyphenyl)propane, 2,2-bis(4-hydroxyphenyl)butane, 4,4-bis(4-hydroxyphenyl)heptane, 2,2-bis(4-hydroxyphenyl)octane, 1,1-bis(4-hydroxyphenyl)decane, 1,1-bis(4-hydroxy-3-methylphenyl)decane, 2,2-bis(3-bromo-4-hydroxyphenyl)propane, bis(4-hydroxyphenyl) diphenylmethane, 1,1-bis(4-hydroxyphenyl)-4-isopropylcyclohexane, 2,2-bis(4-hydroxyphenyl)-1,1,1,3,3,3-hexafluoropropane (commonly known as "bisphenol AF"), 2,2-bis(4-hydroxy-3-methylphenyl)-1,1,1,3,3,3-hexafluoropropane, 2,2-bis(3,5-dimethyl-4-hydroxyphenyl)-1,1,1,3,3,3-hexafluoropropane, 2,2-bis(3-fluoro-4-hydroxyphenyl)-1,1,1,3,3,3-hexafluoropropane, 2,2-bis(3,5-difluoro-4-hydroxyphenyl)-1,1,1,3,3,3-hexafluoropropane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane and 2,2-bis(3-cyclohexyl-4-hydroxyphenyl)propane.

Out of these, bisphenol M, 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, bisphenol A, bisphenol AF and 1,1-bis(4-hydroxyphenyl)decane are preferred. These aromatic diols may be used alone or in combination of two or more.

(Specific Viscosity: $\eta_{sp}$)

The specific viscosity ($\eta_{sp}$) of the polycarbonate resin of the present invention is preferably 0.15 to 1.50. When the specific viscosity is 0.15 to 1.50, strength and moldability become excellent. The specific viscosity is more preferably 0.20 to 1.20, much more preferably 0.20 to 1.00. When the specific viscosity is lower than 0.15, the strength of a molded piece produced by injection molding tends to lower and when the specific viscosity is higher than 1.50, injection moldability tends to degrade.

The specific viscosity as used herein is obtained by measuring a solution prepared by dissolving 0.7 g of the polycarbonate resin in 100 ml of methylene chloride at 20° C. with an Ostwald viscometer.

$$\text{Specific viscosity } (\eta_{sp}) = (t - t_0)/t_0$$

[$t_0$ is a time (seconds) required for the dropping of methylene chloride and t is a time (seconds) required for the dropping of a sample solution]

The specific viscosity can be measured by the following procedure. After the polycarbonate resin is first dissolved in methylene chloride in a weight ratio of 1:20 to 1:30 and soluble matter is collected by cerite filtration, the solution is removed to dry the soluble matter completely so as to obtain a methylene chloride soluble solid. The specific viscosity of a solution prepared by dissolving 0.7 g of the solid in 100 ml of methylene chloride is measured at 20° C. with an Ostwald viscometer.

The polycarbonate resin of the present invention may be used in combination with another resin as long as the effect of the present invention is not impaired.
(Glass Transition Temperature: Tg)

The glass transition temperature (Tg) of the polycarbonate resin of the present invention is preferably 110 to 155° C., more preferably 120 to 150° C. When Tg is 110 to 150° C. and the polycarbonate resin is used as an optical molded article, its heat-resistant stability and moldability become excellent advantageously. When the glass transition temperature (Tg) is lower than 110° C., the heat resistance of a molded piece becomes unsatisfactory disadvantageously. When the glass transition temperature (Tg) of the polycarbonate resin of the present invention is higher than 150° C., injection moldability degrades disadvantageously.

The glass transition temperature (Tg) is measured at a temperature elevation rate of 20° C./min by using the 2910 DSC of TA Instruments, Inc.
(Pencil Hardness)

The pencil hardness of the polycarbonate resin of the present invention is preferably 2H or more. Plastics are relatively soft and easily scratched. Although the pencil hardness of bisphenol-A-PC is low at 4B in the above Patent Document 1, it is easily understood that if the surface hardness of a molded article can be increased to 2H or more in terms of pencil hardness, a scratch on the surface of the molded article can be suppressed completely.

A high pencil hardness of 2H or more can be achieved by using an isosorbide component as the unit (A) and an o-methyl-substituted aromatic component as the unit (B) as the main recurring units and setting the molar ratio of these units to a specific range as described above.

The pencil hardness in the present invention is such that a scratch mark does not remain even when the polycarbonate resin of the present invention is scratched with a pencil having each pencil hardness. Stated more specifically, it is preferred to use as an index pencil hardness used in the surface hardness test of coatings which can be measured in accordance with JIS K-5600. The pencil hardness becomes lower in the order of 9H, 8H, 7H, 6H, 5H, 4H, 3H, 2H, H, F, HB, B, 2B, 3B, 4B, 5B and 6B. Therefore, the highest pencil hardness is 9H, and the lowest pencil hardness is 6B.
(Production Method of Polycarbonate Resin)

The polycarbonate resin of the present invention is produced by reaction means known per se for producing an ordinary polycarbonate resin, for example, a method in which a diol component is reacted with a carbonate precursor such as a diester carbonate. As for the production method, basic means will be briefly described.

A transesterification reaction using a diester carbonate as the carbonate precursor is carried out by stirring an aromatic dihydroxy component and the diester carbonate in a predetermined ratio under heating in an inert gas atmosphere and distilling out the formed alcohol or phenol. The reaction temperature which differs according to the boiling point of the formed alcohol or phenol is generally 120 to 300° C. The reaction is completed while the formed alcohol or phenol is distilled off by setting a reduced pressure from the beginning. An end sealing agent or an antioxidant may be added as required.

The diester carbonate used in the above transesterification reaction is an ester such as an aryl group or aralkyl group having 6 to 12 carbon atoms which may be substituted. Specific examples thereof include diphenyl carbonate, ditolyl carbonate, bis(chlorophenyl)carbonate and m-cresyl carbonate. Out of these, diphenyl carbonate is particularly preferred. The amount of diphenyl carbonate is preferably 0.97 to 1.10 moles, more preferably 1.00 to 1.06 moles based on 1 mole of the total of the dihydroxy compounds.

To increase the polymerization rate in the melt polymerization method, a polymerization catalyst may be used. The polymerization catalyst is selected from an alkali metal compound, an alkali earth metal compound, a nitrogen-containing compound and a metal compound.

Organic acid salts, inorganic salts, oxides, hydroxides, hydrides, alkoxides and quaternary ammonium hydroxides of an alkali metal or an alkali earth metal are preferably used as the above compound, and these compounds may be used alone or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, dibasic sodium phosphate, dibasic potassium phosphate, dibasic lithium phosphate, disodium phenylphosphate, disodium salts, dipotassium salts, dicesium salts and dilithium salts of bisphenol A, and sodium salts, potassium salts, cesium salts and lithium salts of phenol.

Examples of the alkali earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of the nitrogen-containing compound include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole may be used. Bases and basic salts such as ammonia, tetramethylammonium borohydride, tetrabutylammonium borohydride, tetrabutylammonium tetraphenylborate and tetraphenylammonium tetraphenylborate may also be used.

Examples of the metal compound include zinc aluminium compounds, germanium compounds, organic tin compounds, antimony compounds, manganese compounds, titanium compounds and zirconium compounds. These compounds may be used alone or in combination of two or more.

The amount of the polymerization catalyst is preferably $1\times10^{-9}$ to $1\times10^{-2}$ equivalent, more preferably $1\times10^{-8}$ to $1\times10^{-5}$ equivalent, particularly preferably $1\times10^{-7}$ to $1\times10^{-3}$ equivalent based on 1 mole of the diol component.

A catalyst deactivator may be added in the latter stage of the reaction. Known catalyst deactivators are used effectively as the catalyst deactivator. Out of these, ammonium salts and phosphonium salts of sulfonic acid are preferred. Salts of dodecylbenzenesulfonic acid such as tetrabutylphosphonium salts of dodecylbenzenesulfonic acid and salts of paratoluenesulfonic acid such as tetrabutylammonium salts of para-toluenesulfonic acid are more preferred.

Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the ester of sulfonic acid. Out of these, tetrabutylphosphonium salts of dodecylbenzenesulfonic acid are most preferably used.

When at least one polymerization catalyst selected from an alkali metal compound and/or an alkali earth metal compound is used, the amount of the catalyst deactivator is preferably 0.5 to 50 moles, more preferably 0.5 to 10 moles, much more preferably 0.8 to 5 moles based on 1 mole of the polymerization catalyst.

The polycarbonate resin of the present invention may be mixed with additives such as a heat stabilizer, a plasticizer, an optical stabilizer, a polymerization metal inactivating agent, a flame retardant, a lubricant, an antistatic agent, a surfactant, an antibacterial agent, an ultraviolet absorbent and a release agent as required according to purpose.

<Molded Article>

A molded article formed from the polycarbonate resin of the present invention is molded by an arbitrary method such as injection molding, compression molding, extrusion molding or solution casting method. Since the polycarbonate resin of the present invention has excellent moldability and heat resistance, it can be used as various molded articles. It can be advantageously used as a structural material for optical parts such as an optical lenses, optical disks, liquid crystal panels, optical cards, sheets, films, optical fibers, connectors, evaporated plastic reflection mirrors and displays, an electric or electronic part such as an exterior or front panel for personal computers and cell phones, a molded article for use in automobiles such as car head lamps and windows, or a molded article suitable for use as a functional material.

<Film>

A film formed from the polycarbonate resin of the present invention may be used as a surface protection film, a decoration film, a front panel, a phase difference film, a plastic cell substrate film, a polarization plate protection film, an antireflection film, a brightness enhancing film, an optical disk protection film or a diffusion film.

A known method such as a solution casting, melt extrusion, hot press or calendering method may be used as the method of producing an optical film. Out of these, solution casting and melt extrusion methods are preferred, and a melt extrusion method is particularly preferred from the viewpoint of productivity.

In the melt extrusion method, it is preferred to use a T die to extrude the resin and supply the extruded resin onto a cooling roll. The temperature at this point is determined from the molecular weight, Tg and melt flowability of the polycarbonate resin but preferably 180 to 350° C., more preferably 200 to 320° C. When the temperature is lower than 180° C., the viscosity becomes high, whereby the orientation and stress strain of the polymer are apt to remain disadvantageously. When the temperature is higher than 350° C., problems such as heat deterioration, coloration and a die line from the T die tend to occur.

Further, since the polycarbonate resin of the present invention has high solubility in an organic solvent, the solution casting method can also be employed. In the case of the solution casting method, methylene chloride, 1,2-dichloroethane, 1,1,2,2-tetrachloroethane, dioxolane or dioxane is preferably used as the solvent. The amount of the residual solvent contained in the film obtained by the solution casting method is preferably not more than 2 wt %, more preferably not more than 1 wt %. When the amount of the residual solvent is larger than 2 wt %, the glass transition temperature of the film markedly drops, which is not preferred from the viewpoint of heat resistance.

The thickness of an unstretched film formed from the polycarbonate resin of the present invention is preferably 30 to 400 µm, more preferably 40 to 300 µm. To produce a phase difference film by stretching the unstretched film product, the thickness of the unstretched film may be suitably determined from the above range in consideration of the desired phase difference value and thickness of an optical film.

EXAMPLES

The following examples are provided for the purpose of further illustrating the present invention but are in no way to be taken as limiting. "Parts" in the examples means "part by weight". Resins and evaluation methods used in the examples are as follows.

1. Polymer Composition Ratio (NMR)

The polymer composition ratio (molar ratio) was calculated by measuring each recurring unit with the JNM-AL400 proton NMR of JEOL LTD.

2. Measurement of Specific Viscosity

The specific viscosity of a solution prepared by dissolving 0.7 g of the polycarbonate resin in 100 ml of methylene chloride at 20° C. was measured with an Ostwald viscometer.

$$\text{Specific viscosity } (\eta_{sp})=(t-t_0)/t_0$$

[$t_0$ is a time (seconds) required for the dropping of methylene chloride and t is a time (seconds) required for the dropping of a sample solution]

3. Measurement of Glass Transition Temperature

This was measured at a temperature elevation rate of 20° C./min in a nitrogen atmosphere (nitrogen flow rate: 40 ml/min) by using 8 mg of the polycarbonate resin and the DSC-2910 thermal analyzing system of TA Instruments, Inc. in accordance with JIS K7121.

4. Pencil Hardness

The J85-ELIII injection molding machine of The Japan Steel Works, Ltd. was used to mold a pellet into a 2 mm-thick square plate at a cylinder temperature of 250° C. and a mold temperature of 80° C. in a one-minute cycle so as to measure the pencil hardness of the molded test sample in accordance with the substrate testing method of JIS K5600.

5. Content of Biogenic Matter (Plant Derivation Ratio)

The content of a biogenic matter (may also be referred to as "plant ratio") was measured from a biogenic matter content test using percent modern carbon (C14) in accordance with ASTM D6866 05. A higher plant ratio is more preferred, and the ratio of the carbon component of a plant-derived material is preferably not less than 20%, more preferably not less than 25%.

Example 1

Production of Polycarbonate Resin 351 parts of isosorbide (to be abbreviated as ISS hereinafter), 264 parts of 2,2-bis(4-hydroxy-3-methylphenyl)propane (to be abbreviated as BPC hereinafter), 749.7 parts of diphenyl carbonate (to be abbreviated as DPC hereinafter), and $0.8 \times 10^{-2}$ part of tetramethylammonium hydroxide and $0.6 \times 10^{-4}$ part of sodium hydroxide as catalysts were heated at 180° C. in a nitrogen atmosphere to be molten. Thereafter, the vacuum degree was adjusted to 13.4 kPa over 30 minutes. Then, the temperature was raised up to 250° C. at a rate of 60° C./hr and kept at that temperature for 10 minutes, and the pressure was reduced to not more than 133 Pa over 1 hour. A reaction was carried out under agitation for a total of 6 hours, a tetrabutylphosphonium salt of dodecylbenzenesulfonic acid was added in a molar amount of 2 times the total amount of the catalysts to deactivate the catalysts after the end of the reaction, and the reaction product was discharged from the bottom of a reactor under a nitrogen increased pressure, cooled in a water tank and cut with a pelletizer to obtain a pellet. The specific viscosity, glass transition temperature and pencil hardness of the pellet were measured and shown in Table 1.

Example 2

Production of Polycarbonate Resin

The operation of Example 1 was repeated except that 305 parts of 1,1-bis(4-hydroxy-3-methylphenyl)cyclohexane (to be abbreviated as OCZ hereinafter) was used in place of BPC to measure the specific viscosity, glass transition temperature and pencil hardness of the pellet. They are shown in Table 1.

Example 3

Production of Polycarbonate Resin

The operation of Example 1 was repeated except that 220.4 parts of 3,3'-dimethyl(1,1'-biphenyl)-4,4'diol (to be abbreviated as OCBP hereinafter) was used in place of BPC to measure the specific viscosity, glass transition temperature and pencil hardness of the pellet. They are shown in Table 1.

Example 4

Production of Polycarbonate Resin

The operation of Example 1 was repeated except that the amounts of ISS and BPC were changed to 250.5 parts and 439.7 parts, respectively, to measure the specific viscosity, glass transition temperature and pencil hardness of the pellet. They are shown in Table 1.
<Production of Film>

A T die having a width of 150 mm and a lip width of 500 μm and a film take-up unit were set in the 15φ double-screw extrusion kneader of Technovel Corporation to mold the obtained polycarbonate resin at 250° C. so as to obtain a transparent extruded film having a thickness of 100 μm. When the pencil hardness of the obtained film was measured, it was 2H.

Example 5

Production of Polycarbonate Resin

The operation of Example 2 was repeated except that the amounts of ISS and OCZ were changed to 250.5 parts and 508.5 parts, respectively, to measure the specific viscosity, glass transition temperature and pencil hardness of the pellet. They are shown in Table 1.

Example 6

Production of Polycarbonate Resin

The operation of Example 3 was repeated except that the amounts of ISS and OCBP were changed to 250.5 parts and 367.3 parts, respectively, to measure the specific viscosity, glass transition temperature and pencil hardness of the pellet. They are shown in Table 1.

Comparative Example 1

Production of Polycarbonate Resin

The operation of Example 1 was repeated except that 501 parts of ISS and 749.7 parts of DPC were used as raw materials to measure the specific viscosity, glass transition temperature and pencil hardness of the pellet. They are shown in Table 1.

Comparative Example 2

Production of Polycarbonate Resin

The operation of Example 1 was repeated except that 250 parts of ISS, 391 parts of bisphenol-A and 749.7 parts of DPC were used as raw materials to measure the specific viscosity, glass transition temperature and pencil hardness of the pellet. They are shown in Table 1.

Comparative Example 3

Production of Polycarbonate Resin

The operation of Example 1 was repeated except that 351 parts of ISS, 389 parts of 9,9-bis(4-hydroxy-3-methylphenyl) fluorene and 749.7 parts of DPC were used as raw materials to measure the specific viscosity, glass transition temperature and pencil hardness of the pellet. They are shown in Table 1.

Comparative Example 4

Production of Polycarbonate Resin

The operation of Example 1 was repeated except that the amounts of ISS and BPC were changed to 475.9 parts and 44.0 parts, respectively, to measure the specific viscosity, glass transition temperature and pencil hardness of the pellet. They are shown in Table 1.

TABLE 1

| | | Composition | Specific viscosity | Tg (° C.) | Pencil hardness Test sample | Pencil hardness Film | Plant ratio (%) |
|---|---|---|---|---|---|---|---|
| Example 1 | ISS/BPC | 70/30 | 0.343 | 150 | 2H | — | 49.1 |
| Example 2 | ISS/OCZ | 70/30 | 0.351 | 152 | 2H | — | 46.5 |
| Example 3 | ISS/OCBP | 70/30 | 0.339 | 143 | 2H | — | 52.3 |
| Example 4 | ISS/BPC | 50/50 | 0.358 | 133 | 2H | 2H | 31.7 |

TABLE 1-continued

| | Composition | Specific viscosity | Tg (° C.) | Pencil hardness Test sample | Film | Plant ratio (%) |
|---|---|---|---|---|---|---|
| Example 5 | ISS/OCZ | 50/50 | 0.352 | 151 | 2H | — | 29.1 |
| Example 6 | ISS/OCBP | 50/50 | 0.34 | 131 | 2H | — | 35 |
| Comparative Example 1 | ISS | 100 | 0.341 | 160 | H | — | 84.4 |
| Comparative Example 2 | ISS/BPA | 50/50 | 0.363 | 153 | B | — | 33.8 |
| Comparative Example 3 | ISS/BCF | 70/30 | 0.319 | 186 | H | — | 33.8 |
| Comparative Example 4 | ISS/BPC | 95/5 | 0.346 | 158 | H | — | 77.1 |

Comparative Example 5

Production of Polycarbonate Resin

The operation of Example 1 was repeated except that 880 parts of BPC and 749.7 parts of DPC were used as raw materials to measure the specific viscosity, glass transition temperature and pencil hardness of the pellet. They are shown in Table 2. It is understood that high pencil hardness is not obtained from BPC alone.

Comparative Example 6

Production of Polycarbonate Resin

When the operation of Example 1 was repeated except that 735 parts of OCBP and 749.7 parts of DPC were used as raw materials, crystallization occurred during a reaction and a high-molecular-weight material was not obtained.

TABLE 2

| | Composition | Specific viscosity | Tg (° C.) | Pencil hardness | Plant ratio (%) |
|---|---|---|---|---|---|
| C. Ex. 5 | BPC | 100 | 0.346 | 121 | H | 0 |

In Tables 1 and 2, abbreviations denote the following compounds.
ISS: isosorbide
BPC: 2,2-bis(4-hydroxy-3-methylphenyl)propane
OCZ: 1,1-bis(4-hydroxy-3-methylphenyl)cyclohexane
OCBP: 3,3'-dimethyl(1,1'-biphenyl)-4,4'diol
BPA: 2,2-bis(4-hydroxyphenyl)propane
BCF: 9,9-bis(4-hydroxy-3-methylphenyl)fluorene Effect of the Invention Since the polycarbonate resin of the present invention and a molded article and a film thereof contain a unit derived from isosorbide and a unit derived from an o-methyl-substituted aromatic bisphenol in a predetermined ratio, they have high heat resistance, high surface hardness and excellent moldability.

INDUSTRIAL APPLICABILITY

The molded article and film of the present invention can be used in optical parts, electric and electronic parts and auto parts.

The invention claimed is:
1. A polycarbonate resin having a pencil hardness of 2H or more comprising a unit (A) represented by the following formula:

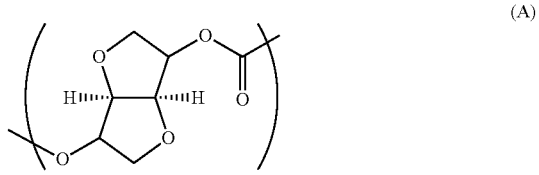

(A)

and a unit (B) represented by the following formula:

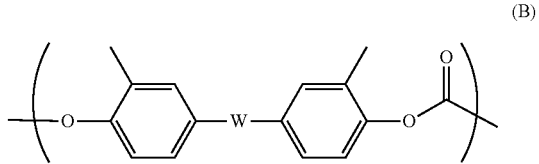

(B)

wherein, in the formula (B), W is a single bond or selected from the following formulas (W):

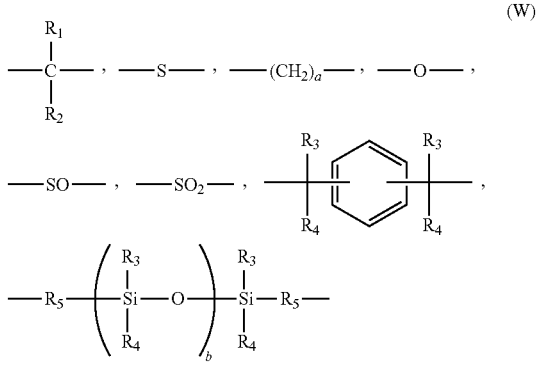

(W)

wherein $R_1$ and $R_2$ are each independently a hydrogen atom, fluorine atom, chlorine atom, bromine atom, iodine atom, alkyl group having 1 to 9 carbon atoms, alkoxy group having 1 to 5 carbon atoms, aryl group having 6 to 12 carbon atoms, alkenyl group having 2 to 5 carbon atoms or aralkyl group having 7 to 17 carbon atoms, wherein $R_1$ and $R_2$ may be bonded together to form a carbon ring or heterocyclic ring, $R_3$ and $R_4$ are each independently a hydrogen atom, fluorine atom, chlorine atom, bromine atom, iodine atom, alkyl group having 1 to 9 carbon atoms, alkoxy group having 1 to 5 carbon atoms or aryl group having 6 to 12 carbon atoms, wherein R$_5$ is an alkylene group having 1 to 9 carbon atoms,
wherein a is an integer of 0 to 20, and
wherein b is an integer of 1 to 500,
and wherein, as the main recurring units, the molar ratio of the unit (A) to the unit (B) being 5/95 to 95/5.

2. The polycarbonate resin according to claim 1, wherein the molar ratio of the unit (A) to the unit (B) is 30/70 to 90/10.

3. The polycarbonate resin according to claim 1, wherein the unit (A) is a unit (A1) represented by the following formula:

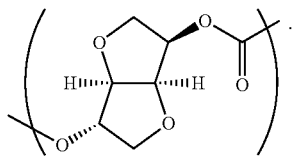

(A1)

4. The polycarbonate resin according to claim 1 which has a glass transition temperature of 110 to 155° C.

5. A molded article formed from the polycarbonate resin of claim 1.

6. A film formed from the polycarbonate resin of claim 1.

7. A molded article formed from the polycarbonate resin of claim 2.

8. A molded article formed from the polycarbonate resin of claim 3.

9. A molded article formed from the polycarbonate resin of claim 4.

10. A film formed from the polycarbonate resin of claim 2.

11. A film formed from the polycarbonate resin of claim 3.

12. A film formed from the polycarbonate resin of claim 4.

* * * * *